US006532233B1

(12) United States Patent
Matsunaga et al.

(10) Patent No.: US 6,532,233 B1
(45) Date of Patent: Mar. 11, 2003

(54) MULTICAST COMMUNICATION METHOD AND APPARATUS

(75) Inventors: Yasuhiko Matsunaga, Tokyo (JP); Morihisa Momona, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/421,065

(22) Filed: Oct. 19, 1999

(30) Foreign Application Priority Data

Oct. 19, 1998 (JP) .......................................... 10-297370

(51) Int. Cl.⁷ .............................................. H04L 12/46
(52) U.S. Cl. ...................... 370/390; 370/467; 370/408; 370/432
(58) Field of Search ................................ 370/467, 469, 370/408, 489, 238, 254, 255, 256, 257, 390, 392, 401, 402, 432

(56) References Cited

U.S. PATENT DOCUMENTS

| | | | |
|---|---|---|---|
| 4,740,954 A | * 4/1988 | Cotton et al. ............... | 370/408 |
| 5,331,637 A | * 7/1994 | Francis et al. .............. | 370/408 |
| 5,608,726 A | 3/1997 | Virgile | |
| 5,818,838 A | * 10/1998 | Backes et al. .............. | 370/401 |
| 5,920,566 A | * 7/1999 | Hendel et al. .............. | 370/401 |

OTHER PUBLICATIONS

Deering, Host Extensions for IP Multicasting, RFC 1112, pp. 1–18, Aug. 1989.*
Fen, Internet Group Management Protocol, Version 2, pp. 1–25, Nov. 1997.*
Japanese Office Action dated Aug. 16, 2001, with partial English translation.
Matsunaga et al., "IP Multicasting over MCNS Compliant CATV Access Systems", MCNS CATV, IGMP Proxy, C&C Media Research Laboratories, NEC Corporation, p. 232.
Japanese Office Action dated Mar. 22, 2001, with partial English translation.

* cited by examiner

*Primary Examiner*—Seema Rao
*Assistant Examiner*—Frank Duong
(74) *Attorney, Agent, or Firm*—McGinn & Gibb, PLLC

(57) ABSTRACT

A multicast communication apparatus includes a center station and subscriber stations. Each station includes input/output ports, and a section for layer-2 bridging between the ports in a 7-layer OSI model. Each station includes a transfer control table for holding group addresses, and an address converting section. Each section also includes a section for transferring a multicast packet to corresponding ports, a section for analyzing the layer-3 message received from each port, a section for checking registration of layer-3 group addresses corresponding to subscription requests, transferring or not transferring the messages depending on whether the group addresses are registered, registering the corresponding group addresses, a section for transferring subscription state query messages and generating/outputting layer-3 multicast subscription request messages destined to acquired layer-3 group addresses, and a section for deleting a layer-3 group address from the table if the corresponding multicast subscription request message is not received for a predetermined period of time, and deleting a layer-2 group address if the corresponding layer-3 group address is not present. A multicast communication method is also disclosed.

7 Claims, 7 Drawing Sheets

| L2 GROUP ADDRESS | L3 GROUP ADDRESS | EXPIRATION TIME |
|---|---|---|
| 01:00:5E:01:01:01 <u>410</u> | 233.1.1.1 <u>420</u> | 00000306 <u>430</u> |
| 01:00:5E:01:02:03 <u>411</u> | 234.1.2.3 <u>421</u> | 00000108 <u>431</u> |
| 01:00:5E:05:06:07 <u>412</u> | 240.5.6.7 <u>422</u> | 00000153 <u>432</u> |
| | 243.5.6.7 <u>423</u> | 00000201 <u>433</u> |
| | | |

400

MULTICAST COMMUNICATION METHOD AND APPARATUS

BACKGROUND OF THE INVENTION

The present invention relates to a multicast communication method and apparatus in a two-way CATV network and, more particularly, to a filtering mechanism for downstream multicast packets in a bridge unit.

In a two-way CATV network, in general, several hundred to several thousand subscriber stations are connected to one center station, and at least one home terminal is connected to each subscriber station. In the two-way CATV network, the downstream links from the center station to the subscriber stations are of a broadcast type, whereas the upstream links from the subscriber stations to the center station are of a multi-access type.

The center and subscriber stations operate as router units for transferring packets of layer 3 between their input/output interfaces in a 7-layer OSI (Open System Interconnection) model or operate as bridge units for transferring packets of layer 2.

A router unit transfers multicast packets by managing group addresses of layer 3 which are to be used for transfer in units of input/output interfaces. Upon reception of a multicast packet, the router unit outputs the packet by selecting an interface to which the packet is to be output on the basis of the layer-3 group address of the destination of the input packet. If there is no interface to which the packet is to be output, the router unit discards the input packet. In addition, the router unit transmits/receives messages to/from a terminal or a neighboring router unit and manages group addresses to be used for transfer in units of interfaces.

According to the TCP (Transmission Control Protocol)/IP (Internet Protocol) protocol, for example, a router unit controls the transfer of multicast packets by transmitting/receiving IGMP (Internet Group Management Protocol) messages to/from a terminal as follows. IGMP is defined by W. Fenner, IETF Request for Comments 2236, November 1997. An outline of IGMP will be described below.

In IGMP, when a terminal starts an application and newly requests distribution of a multicast packet, the terminal transmits a Membership Report Message to a group address corresponding to the distribution request. Upon reception of this message, a router unit distributes the multicast packet of the group address designated to the terminal. In addition, the router unit periodically transmits Membership Query Messages to all multicast terminals to query continuation of the distribution of the multicast packet.

Upon reception of the Membership Query Message, the terminal internally generates a random number and starts a timer. If no Membership Report Message is received from other terminals before the timer expires, the terminal transmits the Membership Report Message to the group address corresponding to the request to continue distribution. If a Membership Report Message is received from another terminal before the timer expires, the terminal stops the timer.

The terminal internally has a flag for recognizing that another terminal is requesting distribution of a multicast packet destined to the same group address inside the subnet. Upon transmission of the Membership Report Message, the terminal turns on this flag. That is, if the flag is OFF, it indicates that at least another terminal in the subnet is requesting distribution of a multicast packet destined to the same group address.

Assume that the terminal is to stop receiving a multicast packet. In this case, if the flag is ON, the terminal transmits a Leave Group Message to the router unit and terminates the application. If the flag is OFF, the terminal terminates the application without explicitly notifying the router unit of leave from the multicast group.

In transferring a multicast packet in a general bridge unit, upon reception of the multicast packet, the bridge unit outputs it to all ports other than the input port except when the packet is statically filtered with the layer-2 group address. A conventional technique for this operation is disclosed in ISO/IEC standard 10038 "Information technology-Telecommunications and information exchange between systems-Local area networks-Media access control (MAC) bridges", section 3.12.

A conventional technique of filtering multicast packets in a bridge unit by using multicast management messages is disclosed in U.S. Pat. No. 5,608,726.

According to U.S. Pat. No. 5,608,726, referring to FIG. 5, when a multicast management message is received, the message type is analyzed. If this message is a multicast subscription request message, the multicast transfer table is updated. According to the method shown in FIG. 6 in U.S. Pat. No. 5,608,726, upon reception of a multicast packet, a bridge unit looks up the multicast transfer table with the destination group address information of the multicast packet and transfers the multicast packet to only the ports designated by the table, thereby preventing the leakage of unnecessary multicast traffic.

When the above subscriber station operates as a bridge unit, all multicast packets on the broadcast type downstream link are transferred to the home terminal network regardless of which multicast packets, destined to specific layer-2 group addresses, the home terminals connected to the subscriber station desire to distribute. If the multicast packets occupy considerable part of data flowing through the downstream link, or the physical speed of the home terminal network that connects the subscriber station to the home terminals is lower than that of the downstream link, in particular, the home terminal network is filled with the multicast traffic on the downstream link. This increases the frequency of downstream packet loss in the subscriber station.

Assume that the center station operates as a bridge unit. In this case as well, upon reception of a multicast packet from an external network, the center station transfers the multicast packet to the downstream link regardless of the presence/absence of subscriber stations, subordinate to the center station, which desire distribution of the multicast packet. For this reason, if many multicast packets flow from an external network into the center station, or the physical speed of the downstream link is not sufficiently high with respect to the external network, the downstream link is filled with multicast traffic. This increases the frequency of downstream packet loss in the center station.

Assume that the technique disclosed in U.S. Pat. No. 5,608,726 is applied to a network in which several hundred to several thousand subscriber stations operating as bridges are present in a single subnetwork, like a CATV network. In this case, upon reception of a multicast subscription request message from a subordinate terminal, a subscriber station keeps transferring multicast packets to all home terminals in the network, regardless of whether the subordinate terminal requires continuation of the transfer of multicast packets destined to the group address designated by the subscription request message, until all the home terminals in the network stop receiving multicast packets destined to the group address.

In U.S. Pat. No. 5,608,726, a bridge analyzes a received multicast management message and then directly transfers it to a terminal or router. For this reason, even after a terminal subordinate to a given bridge leaves a multicast group, the multicast transfer table is updated with the multicast subscription request message generated by a terminal which is subordinate to another bridge and participating in the multicast group, and multicast packets are kept transferred.

SUMMARY OF THE INVENTION

It is an object of the present invention to provide a multicast communication method and apparatus in which when a center station or subscriber station operates as a bridge unit in a two-way CATV network, only multicast packets destined to the group address desired to be used for distribution by a subordinate terminal are transferred upon filtering, thereby efficiently using bands.

In order to achieve the above object, according to the present invention, there is provided a multicast communication apparatus comprising a center station or subscriber station in a two-way CATV network, the center station or subscriber station including a plurality of ports for inputting/outputting packets, means for performing layer-2 bridging between the ports in a 7-layer OSI model, a transfer control table for holding layer-2 and layer-3 group addresses for each of the ports in the 7-layer OSI model, means for converting the layer-3 group address into the layer-2 group address, means for transferring a multicast packet to a corresponding port upon reception of the multicast packet from an arbitrary one of the ports only when a layer-2 group address of a destination of the multicast packet is registered in the table corresponding to each of the ports other than the port through which the multicast packet has been received, means for analyzing the layer-3 message received from each of the ports, and extracting the message if the message is a management message indicating a subscription request for a layer-3 multicast group or subscription state query, means for, when the extracted management message is a multicast subscription request, checking whether the layer-3 group address corresponding to the subscription request has been registered in the table corresponding to the port through which the subscription request message has been received, not transferring the subscription request message to the other ports if the layer-3 group address has been registered, transferring the subscription request message to all the ports other than the port through which the message has been received if the layer-3 group address has not been registered, registering the layer-3 group address corresponding to the subscription request in the table corresponding to the port through which the subscription request message has been received, and also registering a layer-2 group address corresponding to the registered layer-3 group address if the layer-2 group address has not been registered in the table, means, when the extracted management message is a multicast subscription state query, transferring the subscription state query message to all the ports other than the port through which the message is received, acquiring layer-3 group addresses registered in the transfer control tables corresponding to all the ports other than the port through which the message is received, generating layer-3 multicast subscription request messages destined to the respective acquired layer-3 group addresses, and outputting the subscription state query message to the port through which the message is received, and means for, when a multicast subscription request message destined to a layer-3 group addresses registered in the table through the port for a predetermined period of time, deleting the corresponding layer-3 group address from the table, and, when no layer-3 group address corresponding to a layer-2 group address registered in the table is left as a result of deletion, deleting the corresponding layer-2 group address from the table.

DESCRIPTION OF THE PREFERRED EMBODIMENTS

Figure 1:
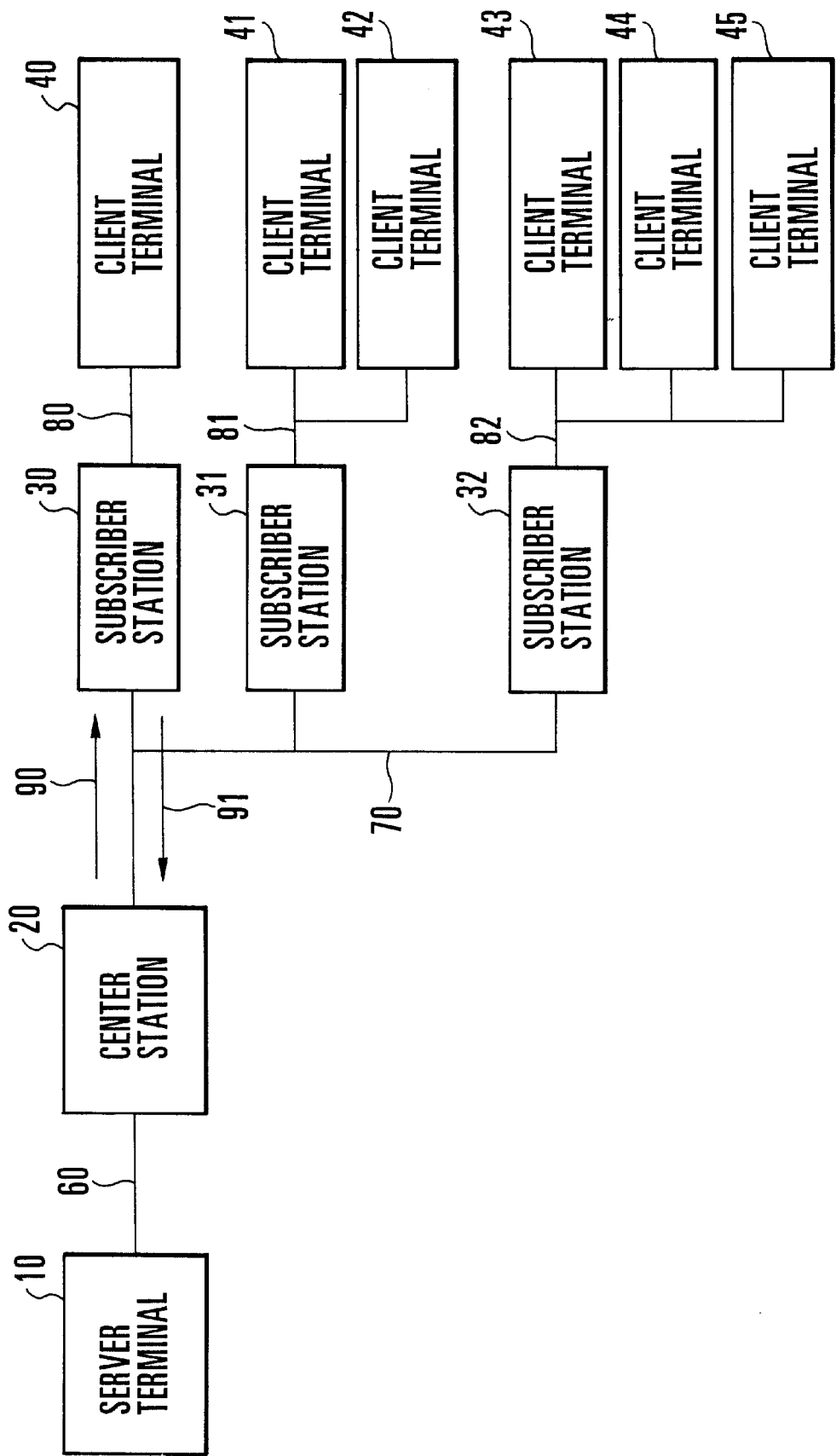
FIG. 1 is a bock diagram showing how a server terminal, center station, subscriber stations, and client terminals are connected to each other in a multicast communication apparatus according to the first embodiment of the present invention.

Embodiments of the present invention will be described in detail next with reference to the accompanying drawings.
First Embodiment FIG. 1 shows how a server terminal 10, center station 20, subscriber stations 30 to 32, client terminals 40 to 45 are connected to each other in a multicast communication apparatus according to the first embodiment of the present invention.

The server terminal 10 and center station 20 are connected to each other through a first line 60. The center station 20 and subscriber stations 30, 31, and 32 are connected to each other through a second line 70. The conjugate section 30 and client terminal 40 are connected to each other through a third line 80. The subscriber station 31 and client terminals 41 and 42 are connected to each other through a third line 81. The subscriber station 32 and client terminals 43, 44, and 45 are connected to each other through a third line 82.

The center station 20 performs layer-3 transfer processing for the packets received from the server terminal 10 or subscriber stations 30, 31, and 32, and operates as a router unit. The subscriber stations 30, 31, and 32 perform layer-2 transfer processing for the packets received from the center station 20 or client terminals 40, 41, 42, 43, 44, and 45, and operate as bridge units.

The first line 60 is an Ethernet having a physical line speed of 100 Mb/s. The second line 70 is a CATV coaxial cable network, in which the typical physical line speeds of the downstream broadcast link and upstream multi-access link are 30 Mb/s and 2 Mb/s, respectively. The third lines 80, 81, and 82 are Ethernets each having a physical line speed of 10 Mb/s.

Figure 2:
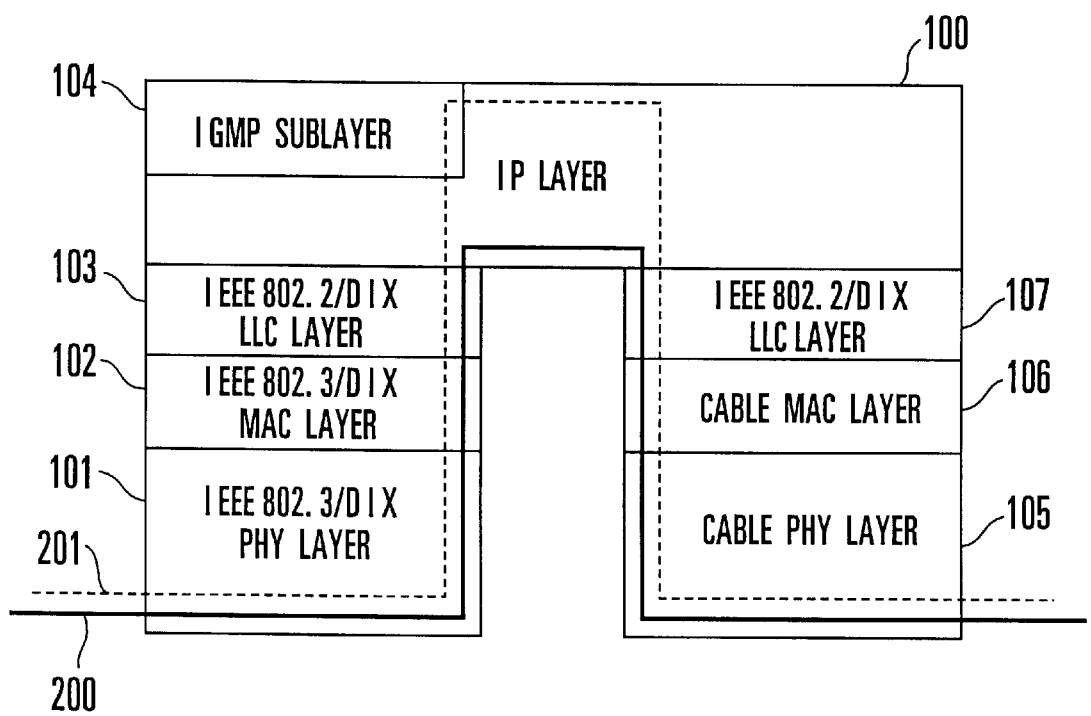
FIG. 2 is a view showing the protocol layers of the center station in the multicast communication apparatus according to the first embodiment of the present invention.

FIG. 2 shows the protocol layers of the center station 20. This embodiment uses the TCP/IP protocol generally used in data communication networks. The protocol layers on the first line 60 side are shown on the left side in FIG. 2, and the protocol layers on the second line 70 side are shown on the right side in FIG. 2. An IEEE802.3/DIX PHY layer 101 on the first line 60 side performs electrical transmission/reception processing with respect to the Ethernet.

An IEEE802.3/DIX MAC layer 102 and IEEE802.2/DIX LLC layer 103 perform layer-2 processing on the first line 60 side, i.e., divide input/output data into frames, couple frames, discard error frames, and perform multi-access control. A Cable PHY layer 105 on the second line 70 side electrically processes RF signals to be transmitted/received through a CATV coaxial network. A Cable MAC layer 106 and IEEE802.2/DIX LLC layer 107 perform layer-2 processing.

Upon reception of a multicast packet 200 from the first line 60 or second line 70, the center station 20 performs processing at these lower layers 101 to 103 or 105 to 107 first, and then performs routing at an IP layer 100 as layer 3. With regard to an IGMP message 201, the center station 20 performs transmission/reception processing at an IGMP sublayer 104 located inside the IP layer 100, and manages the group addresses of multicast packets to be transmitted between the first and second lines 60 and 70.

Figure 3:
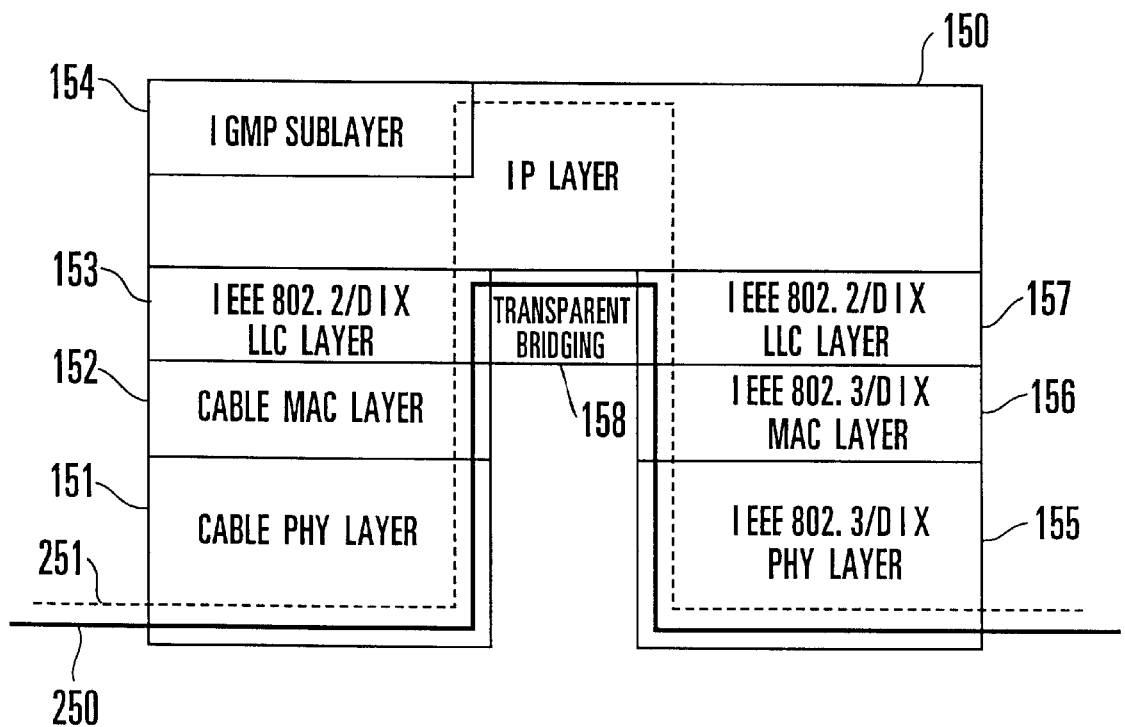
FIG. 3 is a view showing the protocol layers of each subscriber station in the multicast communication apparatus according to the first embodiment of the present invention.

FIG. 3 shows the protocol layers of each of the subscriber stations 30, 31, and 32. The protocol layers on the second line 70 side are shown on the left side in FIG. 3, and the protocol layers on the third lines 80, 81, and 82 are shown on the right side in FIG. 3.

Upon reception of a multicast packet 250 from the second or third line, each of the subscriber stations 30, 31, and 32 performs transparent bridging between IEEE802.2/DIX LLC layers 153 and 157 each serving as layer 2. With regard to an IGMP message 251, similar to the center station 20, each of the subscriber stations 30, 31, and 32 performs transmission/reception processing at an IGMP sublayer 154 located inside an IP layer 150, and manages the group addresses of multicast packets to be transferred to client terminals.

To process the above IGMP message, each of the subscriber stations 30, 31, and 32 checks the protocol number field contained in an IP header upon reception of the packet. Upon determining that the received package is an IGMP message, each subscriber station performs bridging to transfer the message to the IGMP sublayer 154. The IGMP sublayer 154 notifies the bridging process at the lower layers of the group address of the downstream packets at layer 2, which are to be transferred to the client terminals.

Figure 4:
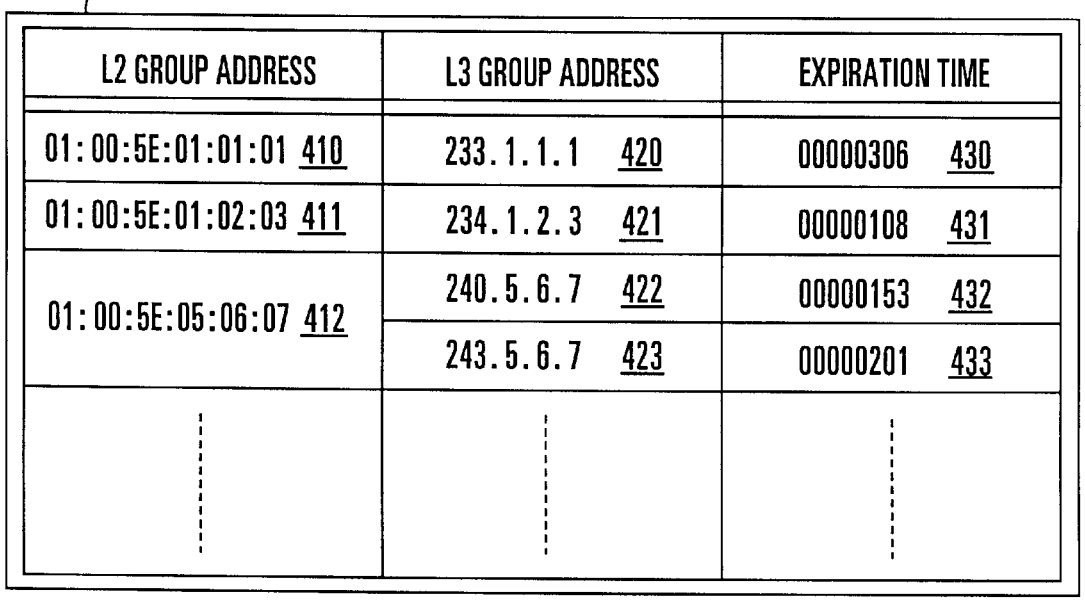
FIG. 4 is a view showing the arrangement of a transfer control table in the multicast communication apparatus according to the first embodiment of the present invention.

FIG. 4 shows an example of the arrangement of a transfer control table 400 for downstream multicast packets in each of the subscriber stations 30, 31, and 32.

In the transfer control table 400, an item 410 indicates a layer-2 group address, an item 420 indicates a layer-3 group address corresponding to the layer-2 group address in the item 410, and an item 430 indicates the expiration time of the item 420. In addition, an item 411 indicates a layer-2 group address; an item 421, a layer-3 group address corresponding to the layer-2 group address in the item 411; an item 431, the expiration time of the item 421; an item 412, a layer-2 group address; items 422 and 423, layer-3 group addresses corresponding to the layer-2 group address in the item 412; and 432 and 433, the expiration times of the items 422 and 423.

Upon reception of the downstream multicast packet 250 from the second line 70, each of the subscriber stations 30, 31, and 32 transfers the received packet through a corresponding one of the third lines 80, 81, and 82 if the layer-2 group address of the destination of the packet is registered in one of the items 410, 411, 412, . . . of the transfer control table 400. If this layer-2 group address is not registered, each of the subscriber stations 30, 31, and 32 discards the received packet.

When each of the subscriber stations 30, 31, and 32 receives an IGMP Membership Report Message from a corresponding one of the third lines 80, 81, and 82, each subscriber station updates the expiration time in the corresponding item and discards the received Membership Report Message if the layer-3 group address designated by this message is registered in one of the items 420, 421, 422, 423, . . . of the transfer control table 400.

If the layer-3 group address is not registered in the transfer control table 400, each of the subscriber stations 30, 31, and 32 transfers the received Membership Report Message to the second line 70, and adds a new layer-3 group address item to the transfer control table 400. In addition, if a layer-2 group address item corresponding to the added layer-3 group address is not registered in the transfer control table 400, each of the subscriber stations 30, 31, and 32 adds a new layer-2 group address item.

If each of the subscriber stations 30, 31, and 32 receives no IGMP Membership Report Message from a corresponding one of the third lines 80, 81, and 82, and the expiration time of the corresponding group address in the transfer control table 400 elapses, each subscriber station discards the corresponding layer-3 group address item. If the number of layer-3 group addresses corresponding to the layer-2 group address become 0, the layer-2 group address item is also deleted from the transfer control table 400.

Figure 5:
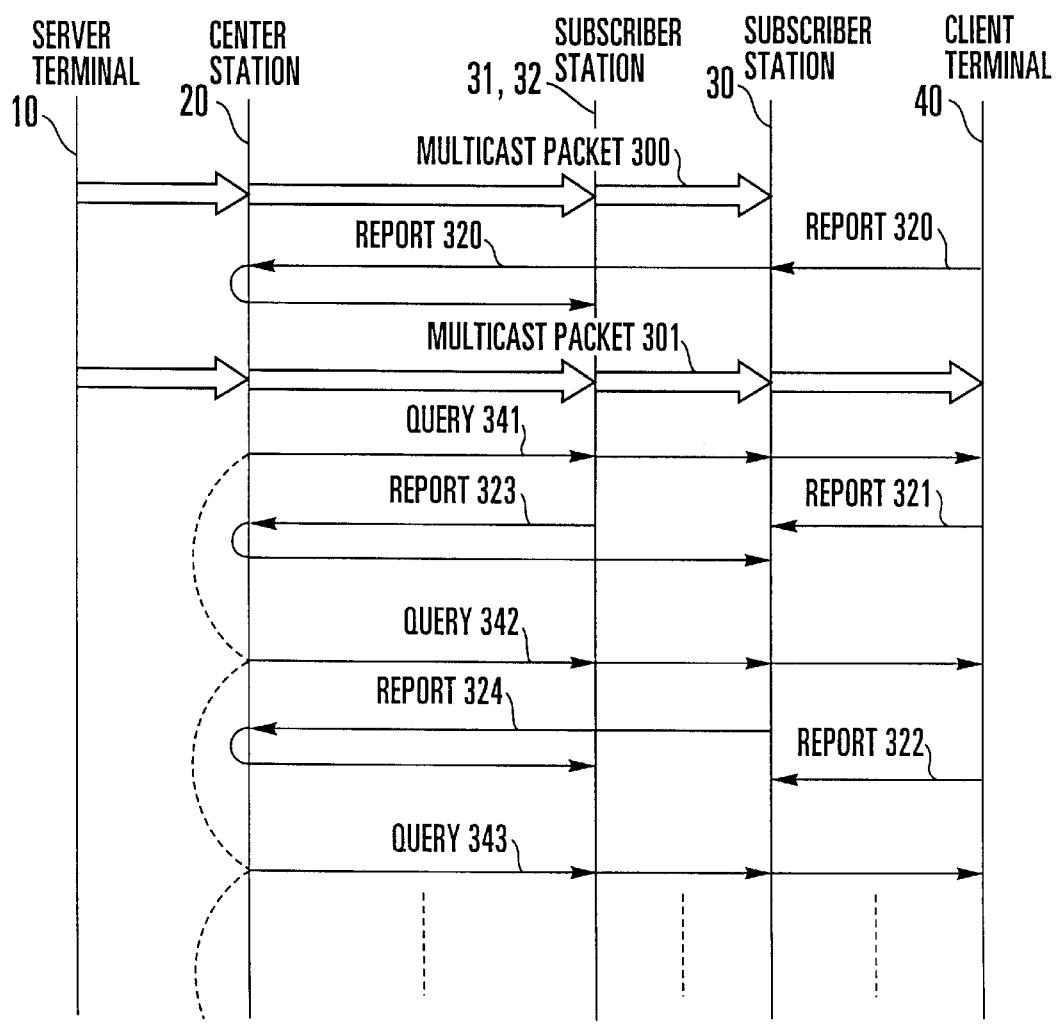
FIG. 5 is a view showing an example of a message sequence in the multicast communication apparatus according to the first embodiment of the present invention.

FIG. 5 shows an example of a message sequence between the server terminal 10, center station 20, subscriber stations 30, 31, and 32, and client terminal 40 in the multicast communication apparatus according to the first embodiment of the present invention. The operation of the first embodiment of the present invention will be described below with reference to the massage sequence between the respective terminals in FIG. 5.

When the subscriber station 30 receives a downstream multicast packet 300 from the center station 20 in an initial state wherein no IGPM Membership Report Message is received from the client terminal 40, the subscriber station 30 discards the received packet without transferring it to the client terminal 40.

To start receiving a downstream multicast packet, the client terminal 40 transmits an IGMP Membership Report Message 320 to the group address corresponding to the transfer request. Upon reception of this Membership Report Message 320, the subscriber station 30 transfers the received message to the center station 20 first. Upon reception of a downstream multicast packet 301 destined to the group address designated by this message from the center station 20 afterward, the subscriber station 30 transfers the downstream multicast packet 301 to the client terminal 40.

Upon reception of IGMP Membership Query Messages 341 and 342 periodically transmitted from the center station 20, the subscriber station 30 transfers the messages to the client terminal 40 to query whether the client terminal 40 desires to continue the transfer of multicast packets. In response to these queries, the client terminal 40 transmits Membership Report Messages 321 and 322 to request the subscriber station 30 to continue the transfer of multicast packets.

If the subscriber station 30 receives no response in the form of a Membership Report Message to the above query from the client terminal 40 for a predetermined period of time or more, the subscriber station 30 stops transferring downstream multicast packets.

The subscriber station 30 also generates IGMP Membership Report Messages destined to the respective layer-3 group addresses registered in the transfer control table 400 for downstream multicast packets in accordance with the Membership Query Messages 341 and 342 received from the center station 20, and transmits the generated messages to the center station 20. If the subscriber station 30 receives a Membership Report Message 323 as a response from another subscriber station 31 or 32 before transmitting a Membership Report Message, the subscriber station 30 does not transmit the Membership Report Message destined to the corresponding group address.

In this manner, each of the subscriber stations 30, 31, and 32 operating as a bridge unit with respect to general multicast packets controls the multicast packet transfer table by transmitting/receiving multicast management messages according to IGMP, thereby transferring only the multicast packets destined to a group address corresponding to a distribution request from a subordinate terminal by filtering without implementing a layer-3 packet routing function or routing information exchange function. This makes is possible to efficiently use bands.

Second Embodiment

Figure 6:
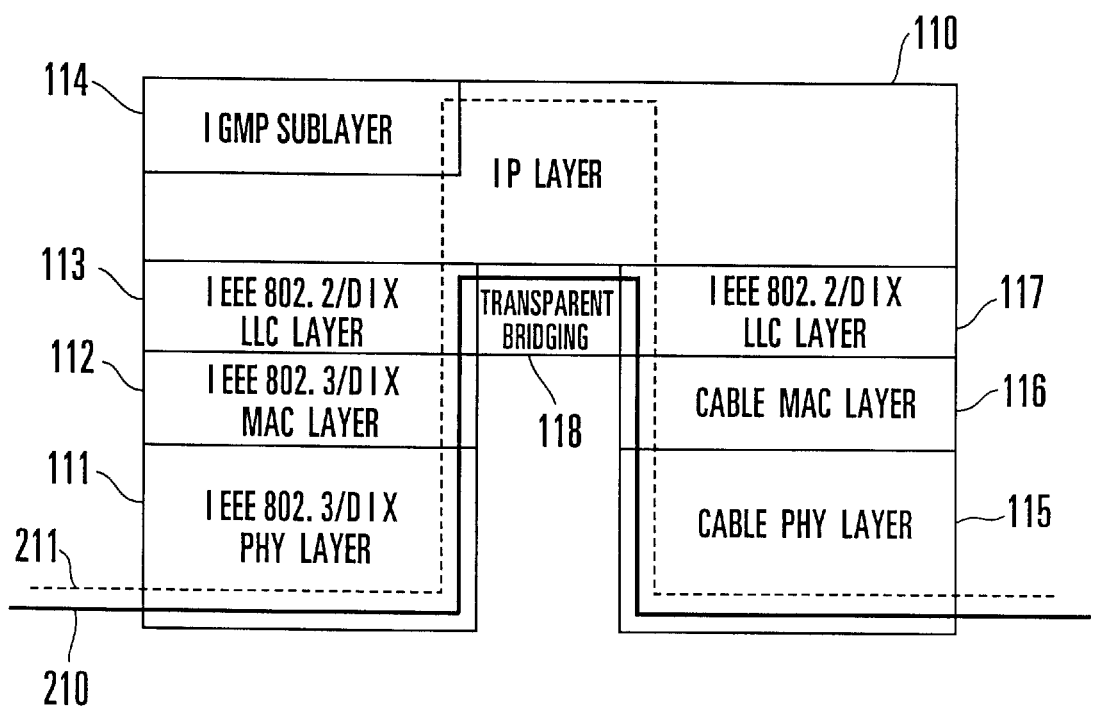
FIG. 6 is a view showing the protocol layers of the center station in the multicast communication apparatus according to the second embodiment of the present invention.

FIG. 6 shows the protocol layers of a center station 20 in a multicast communication apparatus according to the second embodiment of the present invention. The network configuration in the second embodiment is the same as that in the first embodiment. The protocol layers on the first line 60 side are shown on the left side in FIG. 6, and the protocol layers on the second line 70 side are shown on the right side in FIG. 6.

The function of the center station 20 is the same as that of each of the subscriber stations 30, 31, and 32 in the first embodiment. The center station 20 performs layer-2 bridging for a general multicast packet 210. With regard to a IGMP message 211, the center station 20 performs transmission/reception processing at an IGMP sublayer 114 located inside an IP layer 110, and manages the group addresses of the destinations of multicast packets to be transferred from the first line 60 to the second line 70. In addition, the arrangement of a multicast assignment management table in the center station 20 is the same as that of the transfer control table 400 in the first embodiment.

Figure 7:
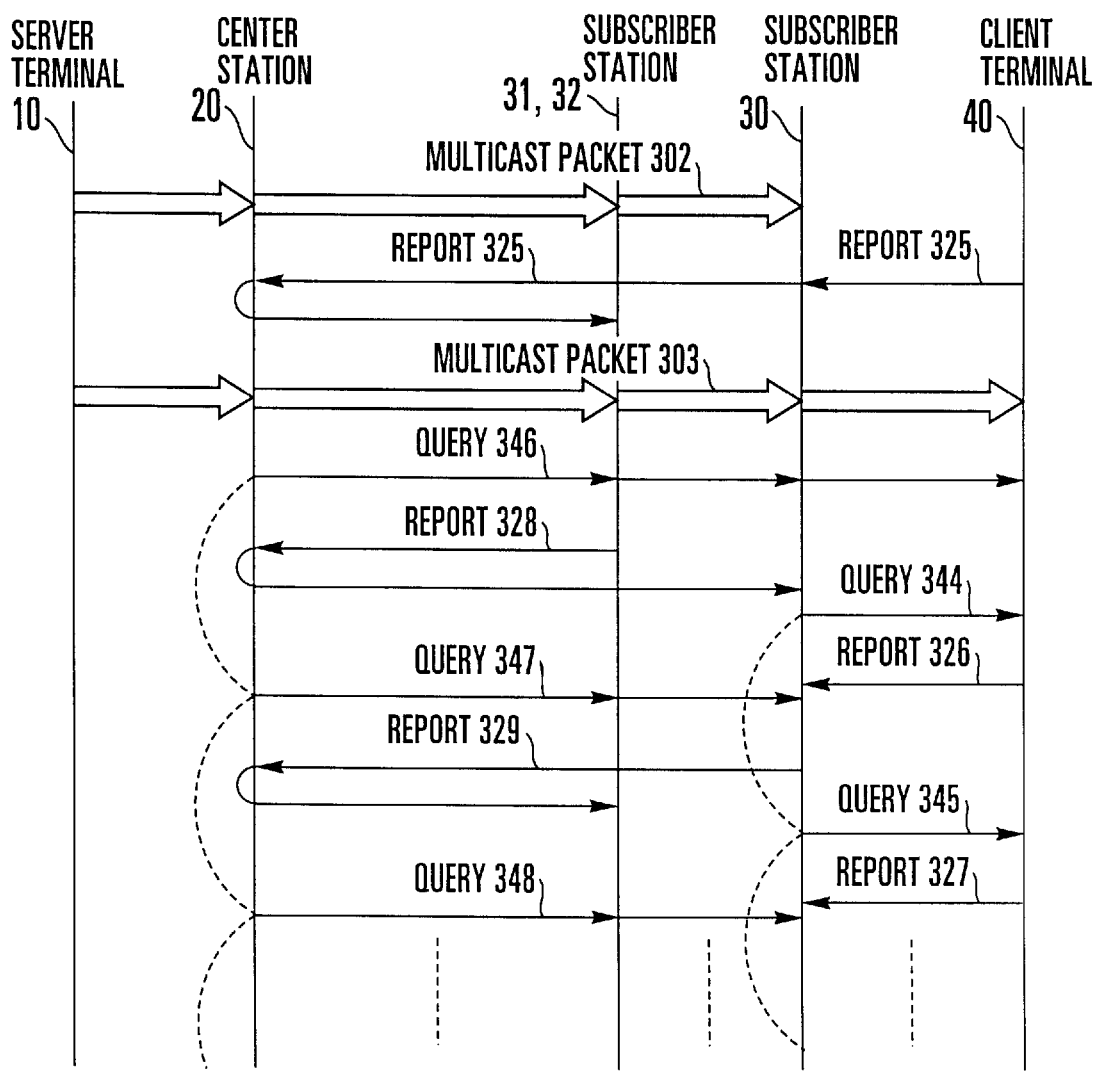
FIG. 7 is a view showing the arrangement of a transfer control table in the multicast communication apparatus according to the second embodiment of the present invention.

FIG. 7 shows an example of a message sequence between a server terminal 10, the center station 20, subscriber stations 30, 31, and 32, and a client terminal 40 in the multicast communication apparatus according to the second embodiment of the present invention.

As in the first embodiment, when the subscriber station 30 receives an IGMP Membership Report Message 325 from the subordinate client terminal 40 for the first time, the subscriber station 30 transfers the received message to the center station 20. In addition, the subscriber station 30 registers the group address designated by the Membership Report Message 325 in the multicast packet transfer control table. Upon reception of a multicast packet 303 destined to the same group address from the center station 20 afterward, the subscriber station 30 transfers the packet 303 to the client terminal 40.

When the center station 20 receives the Membership Report Message 325 from the subordinate subscriber station 30 for the first time, the center station 20 registers the group address designated by the message in the multicast packet transfer control table. Upon reception of the multicast packet 303 destined to the same group address from the server terminal 10 afterward, the center station 20 transfers the packet 303 to the subscriber stations 30, 31, and 32.

In addition, the center station 20 periodically generates IGMP Membership Query Messages 346, 347, 348, . . . and transmits them to the subordinate subscriber stations 30, 31, and 32. In response to these messages, the subscriber stations 30, 31, and 32 generate and transmit Membership Report Messages when they desire distribution of multicast packets. The subscriber station 30 does not transfer the Membership Query Messages, received from the center station 20, to the subordinate client terminal 40, but periodically generates and transmits Membership Query Messages to the subordinate client terminal 40.

In this manner, the center station and subscriber stations operating as bridges generate and transmit IGMP Membership Query Messages. With this operation, even if no router unit corresponding to multicast operation is present in the network, only the multicast packets destined to the group address corresponding to a distribution request from a subordinate terminal can be transferred upon filtering. This makes it possible to efficiently use bands.

As described above, the multicast communication apparatus of the present invention includes the transfer control table 400 holding group addresses of layer-2 and layer-3 packets, which are to be transferred, for the input/output port of the center station 20 or each of the subscriber stations 30, 31, and 32. With this arrangement, the center station 20 or each of the subscriber stations 30, 31, and 32 performs multicast packet filtering by the following method.

Assume that the center station 20 or each of the subscriber stations 30, 31, and 32 receives a multicast packet from an arbitrary port. In this case, if the layer-2 group address of the destination of the received packet is registered in the transfer control table 400 at a port other than the port through which the packet is received, the packet is transferred to the port. If the group address is not registered in the transfer control table 400, the center station 20 or each of the subscriber stations 30, 31, and 32 discards the received packet. With this operation, only the multicast packets destined to the group address corresponding to a distribution request from a subordinate terminal can be obtained by filtering. Group addresses are registered/deleted in/from the transfer control table 400 by transmitting/receiving layer-3 multicast management messages as follows.

First of all, the center station 20 or each of the subscriber stations 30, 31, and 32 checks from the header portion of a received layer-3 multicast packet whether the received packet is a multicast management message. If the received packet is not a multicast management message, the station performs bridging at layer 2. If the received packet is a multicast management message, the station performs the following processing.

If the multicast management message is a multicast subscription request, the center station 20 or each of the subscriber stations 30, 31, and 32 checks whether the layer-3 group address which corresponds to the subscription request has been registered in the transfer control table 400 corresponding to the port through which the packet has been received. If the group address has been registered in the transfer control table 400, the center station 20 or each of the subscriber stations 30, 31, and 32 updates the expiration time of the corresponding layer-3 group address in the table without transferring the received subscription message to other ports. If the group address has not been registered, the center station 20 or each of the subscriber stations 30, 31, and 32 transfers the received subscription message to all ports other than the reception port, and registers the layer-3 group address corresponding to the subscription request in the table.

In addition, the center station 20 or each of the subscriber stations 30, 31, and 32 converts this layer-3 group address into a layer-2 group address, and registers it in the transfer control table 400 corresponding to the port through which the message has been received if the layer-2 group address has not been registered. Layer-2 group addresses and layer-3 group addresses do not necessarily show a one-to-one correspondence. If, for example, communication is performed in an IEEE802.3 network by using the TCP/IP protocol, a maximum of 32 layer-3 group addresses correspond to one layer-2 group address. For this reason, layer-3 group addresses are registered in the table 400 as well as layer-2 group addresses, although multicast packet transfer control is performed by looking up only the layer-2 group addresses in the table 400.

If the multicast management message is a multicast subscription state query message, the center station 20 or each of the subscriber stations 30, 31, and 32 transfers this subscription state query message to all ports other than the port through which the message is received, acquires layer-3 group addresses registered in the table 400 and corresponding to all the ports other than the reception port. The station then generates layer-3 multicast subscription request messages destined to the respective acquired layer-3 group addresses, and outputs the generated messages to the port through which the subscription state query message has been received.

Predetermined expiration times are given to the respective layer-3 and layer-2 group addresses registered in the table 400. These expiration times are updated every time a multicast subscription request message is received. If the center station 20 or each of the subscriber stations 30, 31, and 32 does not receive any multicast subscription request message destined to a layer-3 group address registered in the table 400 for a predetermined period of time, the station deletes the corresponding layer-3 group address from the table. If there is no layer-3 group address corresponding to the layer-2 group addresses as a result of this deletion, the center station 20 or each of the subscriber stations 30, 31, and 32 deletes the layer-2 group addresses from the table 400.

The multicast communication apparatus of the present invention does not transfer any multicast subscription request of received layer-3 multicast management messages to other ports except when receiving a subscription request message from a subordinate terminal for the first time. For this reason, unlike the technique disclosed in U.S. Pat. No. 5,608,726, according to the multicast communication apparatus of the present invention, a given terminal subordinate to a bridge unit does not stop transmitting a multicast subscription request message upon reception of a multicast subscription request message transmitted from another terminal subordinate to the bridge unit.

In addition, the multicast communication apparatus of the present invention includes the means for deleting a registered group address from the table if a multicast subscription state query message is transferred to an arbitrary port, and no multicast subscription request message is received from a terminal subordinate to the port within a predetermined period of time after a multicast subscription state query message is transferred to an arbitrary port. When, therefore, the subordinate terminal stops receiving a multicast packet, transfer of a multicast packet can be quickly stopped.

In the multicast communication apparatus of the present invention, multicast subscription state query messages are periodically generated and transmitted from an arbitrary port of the center station or each of the subscriber stations. In addition, upon reception of a multicast subscription state query message, the station does not transfer it to other ports. In general, a router unit generates and transmits a multicast subscription state query message. If, however, this multicast subscription state query transmission function is added to the multicast communication apparatus, the received multicast packet can be transferred to only the ports which request transfer instead of all the ports without any router unit in the network configuration, thereby efficiently using bands.

In the multicast communication apparatus of the present invention, the center station 20 or each of the subscriber stations 30, 31, and 32 includes a first port for inputting downstream packets and outputting upstream packets and second port for outputting downstream packets and inputting upstream packets, and performs layer-2 bridging between the first and second ports in the 7-layer OSI model.

In addition, this apparatus includes the means for converting a layer-3 group address into a layer-2 group address. If, therefore, a downstream multicast packet is received from the first port, and the layer-2 group address of the destination of the packet is registered in the table 400, the center station 20 or each of the subscriber stations 30, 31, and 32 transfers the packet to the second port. If the group address is not registered, the station discards the received downstream multicast packet. Addresses are dynamically added/deleted to/from the table 400 by transmitting/receiving multicast management messages as follows.

Upon reception of a multicast subscription request message from the second port, the center station 20 or each of the subscriber stations 30, 31, and 32 checks whether the layer-3 group address corresponding to the subscription request has been registered in the table 400. If this group address has been registered, the center station 20 or each of the subscriber stations 30, 31, and 32 does not transfer this subscription request message to the first port. If the group address has not been registered, the station transfers the message to the first port, and registers the layer-3 group address corresponding to the subscription request in the table 400. In addition, if the layer-2 group address corresponding to the registered layer-3 group address has not been registered, the station registers it as well.

As described above, a downstream multicast packet is transferred, when a multicast subscription request message is received from a subordinate terminal connected to the second port for the first time. In addition, the center station 20 or each of the subscriber stations 30, 31, and 32 periodically transmits multicast subscription state query messages from the second port to query whether the terminal connected to the second port desires to continue transfer of downstream multicast packets.

Upon reception of a multicast subscription state query message from the first port, the center station 20 or each of the subscriber stations 30, 31, and 32 acquires layer-3 group address registered in the table 400 without transferring this message to the second port, and generates layer-3 multicast subscription request messages destined to the respective acquired layer-3 group addresses. This station then outputs the messages from the first port. If the center station 20 or each of the subscriber stations 30, 31, and 32 receives a multicast subscription request message destined to the same layer-3 group address from another subscriber station or center station before outputting a subscription request message, the station discards the message without outputting it.

If the center station 20 or each of the subscriber stations 30, 31, and 32 does not receive a multicast subscription request message destined to any one of the layer-3 group addresses registered in the table 400 from the second port for a predetermined period of time, the station deletes the corresponding layer-3 group address from the table 400. If no layer-3 group address corresponding to any layer-2 group address is left as a result of this deletion, the station deletes the layer-2 group addresses from the table 400.

What is claimed is:

1. A multicast communication apparatus comprising a center station or subscriber station in a two-way CATV network, said center station or subscriber station including:
   a plurality of ports for inputting/ou tputting packets;
   means for performing layer-2 bridging between said ports in a 7-layer OSI model;
   a transfer control table for holding layer-2 and layer-3 group addresses for each of said ports in the 7-layer OSI model;
   means for converting th e layer-3 group address into the layer-2 group address;
   means for transferring a multicast packet to a corresponding port upon reception of the multicast packet from an arbitrary one of said ports only when a layer-2 group address of a destination of the multicast packet is registered in said table corresponding to each of said ports other than said port through which the multicast packet has been received;
   means for analyzing the layer-3 message received from each of said ports, and extracting the message if the message is a management message indicating a subscription request for a layer-3 multicast group or subscription state query;
   means for, when the extracted management message is a multicast subscription request, checking whether the layer-3 group address corresponding to the subscription request has been registered in said table corresponding to said port through which the subscription request message has been received, not transferring the subscription request message to said other ports if the layer-3 group address has been registered, transferring the subscription request message to all said ports other than said port through which the message has been received if the layer-3 group address has not been registered, registering the layer-3 group address corresponding to the subscription request in said table corresponding to said port through which the subscription request message has been received, and also registering a layer-2 group address corresponding to the registered layer-3 group address if the layer-2 group address has not been registered in said table;
   means, when the extracted management message is a multicast subscription state query, transferring the subscription state query message to all said ports other than said port through which the message is received, acquiring layer-3 group addresses registered in said transfer control tables corresponding to all said ports other than said port through which the message is received, generating layer-3 multicast subscription request messages destined to the respective acquired layer-3 group addresses, and outputting the subscription state query message to said port through which the message is received; and
   means for, when a multicast subscription request message destined to a layer-3 group addresses registered in said table through said port for a predetermined period of time, deleting the corresponding layer-3 group address from said table, and, when no layer-3 group address corresponding to a layer-2 group address registered in said table is left as a result of deletion, deleting the corresponding layer-2 group address from said table.

2. A multicast communication apparatus comprising a center station or subscriber station in a two-way CATV network, said center station or subscriber station including:
   a plurality of ports for inputting/outputting packets;
   means for performing layer-2 bridging between said ports in a 7-layer OSI model;
   a transfer control table for holding layer-2 and layer-3 group addresses for each of said ports in the 7-layer OSI model;
   means for converting the layer-3 group address into the layer-2 group address;
   means for transferring a multicast packet to a corresponding port upon reception of the multicast packet from an arbitrary one of said ports only when a layer-2 group address of a destination of the multicast packet is registered in said table corresponding to each of said ports other than said port through which the multicast packet has been received;
   means for analyzing the layer-3 message received from each of said ports, and extracting the message if the message is a management message indicating a subscription request for a layer-3 multicast group or subscription state query;
   means for, when the extracted management message is a multicast subscription request, checking whether the layer-3 group address corresponding to the subscription request has been registered in said table corresponding to said port through which the subscription request message has been received, not transferring the subscription request message to said other ports if the layer-3 group address has been registered, transferring the subscription request message to all said ports other than said port through which the message has been received if the layer-3 group address has not been registered, registering the layer-3 group address corresponding to the subscription request in said table corresponding to said port through which the subscription request message has been received, and also registering a layer-2 group address corresponding to the registered layer-3 group address if the layer-2 group address has not been registered in said table;
   means for, when a multicast subscription state query message is received from said port, not transferring the message to said other ports, acquiring layer-3 group addresses registered in said transfer control tables corresponding to all said ports, other than said port through which the message is received, by looking up said transfer control tables, generating multicast subscription request messages destined to the respective acquired layer-3 group addresses, and outputting a multicast subscription state query message from said port through which the message is received;
   means for periodically transmitting multicast subscription state query messages from an arbitrary one of said ports; and
   means for, when a multicast subscription request message destined to a layer-3 group addresses registered in said table through said port for a predetermined period of time, deleting the corresponding layer-3 group address from said table, and, when no layer-3 group address corresponding to a layer-2 group address registered in said table is left as a result of deletion, deleting the corresponding layer-2 group address from said table.

3. A multicast communication apparatus comprising a center station or subscriber station in a two-way CATV network, said center station or subscriber station including:

a first port for inputting a downstream packet and outputting a upstream packet;

a second port for outputting a downstream packet and inputting a upstream packet;

means for performing layer-2 bridging between said first and second ports in a 7-layer OSI model;

a transfer control table for holding layer-2 and layer-3 group addresses of a destination of a downstream multicast packet to be used for transfer from said first port to said second port;

means for converting the layer-3 group address into the layer-2 group address;

means for transferring a downstream multicast packet received from said first port to said second port only when a layer-2 group address of a destination of the downstream multicast packet is registered in said table, and discarding the downstream multicast packet if the layer-2 group address is not registered;

means for analyzing types of layer-3 messages received from said first and second ports;

means for, when a multicast subscription request message is received from said second port, checking whether a layer-3 group address corresponding to the subscription request has been registered in said table, not transferring the subscription request message to said first port if the layer-3 group address has been registered, transferring the subscription request message to said first port if the layer-3 group address has not been registered, and registering a layer-2 group address corresponding to the registered layer-3 group address if the layer-2 group address has not been registered in said table;

means for periodically transmitting multicast subscription state query messages from said second port;

means for, when a multicast subscription state query message is received from said first port, not transferring the message to said second port, acquiring layer-3 group addresses registered in said table, generating layer-3 multicast subscription request messages destined to the respective acquired layer-3 group addresses, and outputting the messages from said first port; and means for, when a multicast subscription request message destined to a layer-3 group addresses registered in said table is not received from said second port for a predetermined period of time, deleting the corresponding layer-3 group address from said table, and, when no layer-3 group address corresponding to a layer-2 group address registered in said table is left as a result of deletion, deleting the corresponding layer-2 group address from said table.

4. A multicast communication method in a center station or subscriber station in a two-way CATV network, which includes a transfer control table for each input/output port of said center station or subscriber station to hold layer-2 and layer-3 group addresses to be used for transfer, transfers a multicast packet, when receiving the multicast packet from an arbitrary port, to a port other than said port through which the packet is received if a group address of a destination of the received packet at layer 2 is registered in said table corresponding to said port other than said port through which the packet is received, and discards the received packet if the group address is not registered, thereby performing filtering to obtain only a multicast packet destined to a group address desired to be used for distribution by a subordinate terminal, comprising the steps of:

when the multicast packet received through said port is a multicast management message and the management message is a multicast subscription request, checking whether a layer-3 group address corresponding to the subscription request has been registered in said table corresponding to said port through which the packet is received, updating an expiration time of the layer-3 group address in said table without transferring the subscription request message to other ports if the layer-3 group address has been registered, transferring the received subscription request message to all said ports other than the reception port if the layer-3 group address has been registered, also registering the layer-3 group address corresponding to the subscription request in said table, converting the layer-3 group address into the layer-2 group address, and registering the layer-2 group address in said table corresponding to said port through which the message is received if the layer-2 group address has not be registered in said table; and when the received multicast management message is a multicast subscription state query message, transferring the subscription state query message to all said ports other than said port through which the message is received, acquiring layer-3 group addresses registered in said tables corresponding to all said ports other than said port through which the message is received, generating layer-3 multicast subscription request messages destined to the respective acquired layer-3 group addresses, and outputting the subscription state query message to said port through which the message is received.

5. A method according to claim 4, further comprising the step of setting a predetermined expiration time for each of layer-3 and layer-2 group addresses registered in said table, updating the expiration time every time the multicast subscription request message is received, deleting the layer-3 group address registered in said table if no multicast subscription request message destined to the layer-3 group address is received for a predetermined period of time, and, if no layer-3 group address corresponding to the layer-2 group address is left as a result of deletion of the layer-3 group address, deleting the corresponding layer-2 group address from said table.

6. A multicast communication method in a center station or subscriber station which includes a first port for inputting a downstream packet and outputting a upstream packet, a second port for outputting a downstream packet and inputting a upstream packet, and a transfer control table for holding a layer-2 group address and layer-3 group address of a destination of a downstream multicast packet to be transferred from said first port to said second port, transfers a downstream multicast packet received from said first port to said second port only when a layer-2 group address of a destination of the downstream multicast packet is registered in said table, and discards the received packet if the layer-2 group address is not registered, thereby performing filtering to obtain only a multicast packet destined to a group address desired to be used for distribution by a subordinate terminal, comprising the steps of:

periodically transmitting multicast subscription state query messages from said second port, not transferring a multicast subscription request message received from said second port to said first port if a layer-3 group address corresponding to the subscription request has been registered in said table, transferring the subscription request message to said first port if the layer-3 group address has not been registered, registering the layer-3 group address corresponding to the subscription request in said table, and also registering a layer-2 group address corresponding to the registered layer-3 group address in said table if the layer-2 group address has not been registered in said table; and when a multicast subscription state query message is received from said first port, acquiring layer-3 group addresses registered in said table without transferring the message to said second port, generating layer-3 multicast subscription request messages destined to the respective acquired layer-3 group addresses, and outputting the subscription request messages from said first port.

7. A method according to claim 6, further comprising the step of, when no multicast subscription request message destined to a layer-3 group address registered in said table is received from said second port for a predetermined period of time, deleting the corresponding layer-3 group address from said table, and, if no layer-3 group address corresponding to the layer-2 group address is left, deleting the corresponding layer-2 group address from said table.

* * * * *